United States Patent
Mashtare et al.

(10) Patent No.: US 9,302,498 B2
(45) Date of Patent: Apr. 5, 2016

(54) MICROSTRUCTURED IMAGE OVERCOAT LAYER FOR IMPROVED IMAGE UNIFORMITY APPLIED WITH BLANKET OVERCOATER AND FUNCTIONAL EMBOSSING ROLLER

(75) Inventors: Dale R. Mashtare, Bloomfield, NY (US); Eluid Robles-Flores, Webster, NY (US); Paul Bonino, Ontario, NY (US); Matthew Fabrizio, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 1317 days.

(21) Appl. No.: 12/436,645

(22) Filed: May 6, 2009

(65) Prior Publication Data

US 2010/0285281 A1 Nov. 11, 2010

(51) Int. Cl.
| | |
|---|---|
| *B41J 3/38* | (2006.01) |
| *G02B 3/00* | (2006.01) |
| *G03G 8/00* | (2006.01) |
| *B41M 1/24* | (2006.01) |
| *B41M 7/00* | (2006.01) |

(52) U.S. Cl.
CPC . *B41J 3/38* (2013.01); *G02B 3/005* (2013.01); *G03G 8/00* (2013.01); *B41M 1/24* (2013.01); *B41M 7/0045* (2013.01); *B41M 7/0054* (2013.01); *Y10T 428/24802* (2015.01)

(58) Field of Classification Search
CPC ..... G02B 3/0062; G02B 5/188; G02B 6/4469
USPC .......... 427/256; 428/195.1; 399/341; 283/72
See application file for complete search history.

(56) References Cited

U.S. PATENT DOCUMENTS

| | | | | |
|---|---|---|---|---|
| 4,289,821 | A | * | 9/1981 | Gray et al. ..................... 428/172 |
| 5,318,807 | A | * | 6/1994 | Gili Picoy ..................... 427/510 |
| 5,712,731 | A | | 1/1998 | Drinkwater et al. |
| 5,991,512 | A | | 11/1999 | Shaked et al. |
| 6,775,029 | B1 | | 8/2004 | Wen et al. |
| 7,333,268 | B2 | * | 2/2008 | Steenblik et al. ............. 359/619 |

(Continued)

OTHER PUBLICATIONS http://www.drhalftone.com/Lau_Consulting_Inc./Halftoning/Entries/2009/4/30_1._What_is_halftoning.html, Dr. Daniel Lau, What is Halftoning?, Retrieved from internet on Oct. 25, 2011.*
Yule, J. and Nielsen, W., The Penetration of Light into Paper and its effect on Halftone Reproduction, Technical Association of the Graphic Arts, May 7-9, 1951, pp. 65-76.*

(Continued)

*Primary Examiner* — Francisco Tschen
(74) *Attorney, Agent, or Firm* — MH2 Technology Law Group LLP

(57) ABSTRACT

In accordance with various embodiments, there are printing apparatuses and methods of enhancing an image quality on a media. The method of enhancing an image quality on a media can include providing an ink-based halftone image on a media, wherein the halftone image can include an amount of noise. The method can also include depositing a transparent overcoat layer at least over the halftone image, wherein the transparent overcoat layer can include a major amount of cross-linkable resin and a minor amount of a photoinitiator. The method can further include embossing the transparent overcoat layer to form an embossed micro-structured overcoat layer and curing the embossed micro-structured overcoat layer to form the micro-structured overcoat layer, such that the micro-structured overcoat layer reduces the amount of noise.

9 Claims, 4 Drawing Sheets

(56) References Cited

U.S. PATENT DOCUMENTS

| | | | |
|---|---|---|---|
| 2003/0058472 A1* | 3/2003 | Davies et al. | 358/1.18 |
| 2003/0164580 A1* | 9/2003 | Rinker et al. | 264/496 |
| 2004/0140665 A1 | 7/2004 | Scarbrough et al. | |
| 2008/0182084 A1* | 7/2008 | Tompkin et al. | 428/195.1 |
| 2008/0212193 A1 | 9/2008 | Steenblik et al. | |

OTHER PUBLICATIONS

Considine, Characterization of Paper Heterogeneity, Dissertation, University of Wisconsin, 2013.*

European Patent Office, European Patent Application No. 10162054.0, European Search Report, Aug. 19, 2010, 3 Pages.

* cited by examiner

MICROSTRUCTURED IMAGE OVERCOAT LAYER FOR IMPROVED IMAGE UNIFORMITY APPLIED WITH BLANKET OVERCOATER AND FUNCTIONAL EMBOSSING ROLLER

DESCRIPTION OF THE INVENTION

1. Field of the Invention

The present invention relates to image quality on a media and printing apparatuses and, more particularly, to methods of improving image quality on a media.

2. Background of the Invention

Halftone image print uniformity is affected by image noise in the form of mottle—defined as random, 2-d lightness non-uniformities occurring in the 1-5 mm spatial domain. It has been demonstrated that mottle is influenced by variation across the coated paper substrates and across a range of print technologies. Hence, optical property of the substrate itself serves to exacerbate the print non-uniformities. Studies examining a variety of coated media and synthetic media have shown that papers can be identified that provide superior image smoothness—reducing halftone mottle levels by as much as 10 to 30%.

Overcoating processes (for example, using UV or Aqueous overcoater by Epic Products International Corporation, Arlington, Tex.) are commonly applied that provide a uniform polymeric overcoat layer in blanket or image wise uniform fashion. These overcoats do serve to provide improved robustness, more uniform gloss, and even improved color performance, but as they are a planar overcoat layer they do little to affect the image noise performance of the output image.

Furthermore, it has been described in detail in the literature that the halftone dot gain is strongly dependent upon the paper type. The Yule-Nielsen effect, which describes this optical dot gain predicts the perceived darkness around the region of a halftone dot which is convolved with a point spread function of the paper. This result is effectively a diffusion of the dot structure that results in darker or lighter tones, dependent upon the ink and paper properties. The Yule-Nielsen equation is given as:

$$PDA = \frac{1 - 10^{-Dt/n}}{1 - 10^{-Ds/n}} \times 100$$

wherein PDA refers to the physical dot area, Dt refers to the relative density of tint, Ds refers to the relative density of solid, and n is the correction factor. The correction factor n, is highly dependent upon the paper and can vary from about 1 to as high as about 4—which could have significant impact on the observed, effective halftone dot area. Coated papers n-value applied for this empirical formula are commonly in the range of about 1.5 to about 1.7 and uncoated papers can be in range of about 2.0 to about 2.7.

FIG. 1 schematically shows some of the sources that can lead to this optical diffusion surrounding the halftone dot. FIGS. 2A and 2B illustrate the effect of about 16% dot gain and about 36% dot gain respectively on about 20% dot area. The image variations can occur in the paper bulk and/or the coating process, hence the effective correction factor n can vary significantly within a sheet and can lead to significantly varied perceived halftone densities through an intentionally uniform region of halftone area.

Accordingly, there is a need to overcome these and other problems of prior art to provide new methods of improving image quality on a media.

SUMMARY OF THE INVENTION

In accordance with various embodiments, there is a method of enhancing an image quality on a media. The method can include providing an ink-based halftone image on a media, wherein the halftone image can include an amount of noise. The method can also include depositing a transparent overcoat layer at least over the halftone image, wherein the transparent overcoat layer can include a major amount of cross-linkable resin and a minor amount of a photoinitiator. The method can further include embossing the transparent overcoat layer to form an embossed micro-structured overcoat layer and curing the embossed micro-structured overcoat layer to form the micro-structured overcoat layer, such that the micro-structured overcoat layer reduces the amount of noise.

According to various embodiments, there is a printing apparatus. The printing apparatus can include an image enhancement subsystem to reduce an amount of noise in an image on a media thereby improve the image quality. The image enhancement subsystem can include an overcoat layer deposition system to deposit a transparent overcoat layer at least over the image on the media, wherein the transparent overcoat layer can include a major amount of cross-linkable resin and a minor amount of a photoinitiator, an embosser to emboss the transparent overcoat layer to form an embossed micro-structured overcoat layer at least over the image on the media, and a curing station to cure the embossed micro-structured overcoat layer to form the micro-structured overcoat layer, such that the micro-structured overcoat layer reduces the amount of noise.

In accordance with another embodiment, there is an image on a media, the media including a micro-structured overcoat layer at least over the image, such that the micro-structured overcoat layer reduces an amount of noise in the image.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
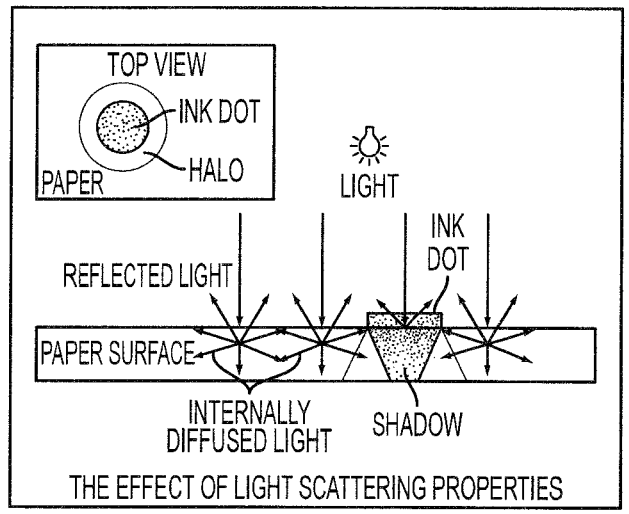
FIG. 1 schematically illustrates optical scattering leading to Yule-Nielson effect.
Figure 2A:
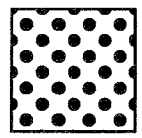
FIGS. 2A and 2B schematically illustrate the effect of image variation that can occur as a result of varied diffusion factor.
Figure 2B:
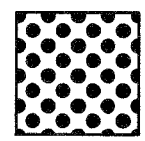
Figure 3:
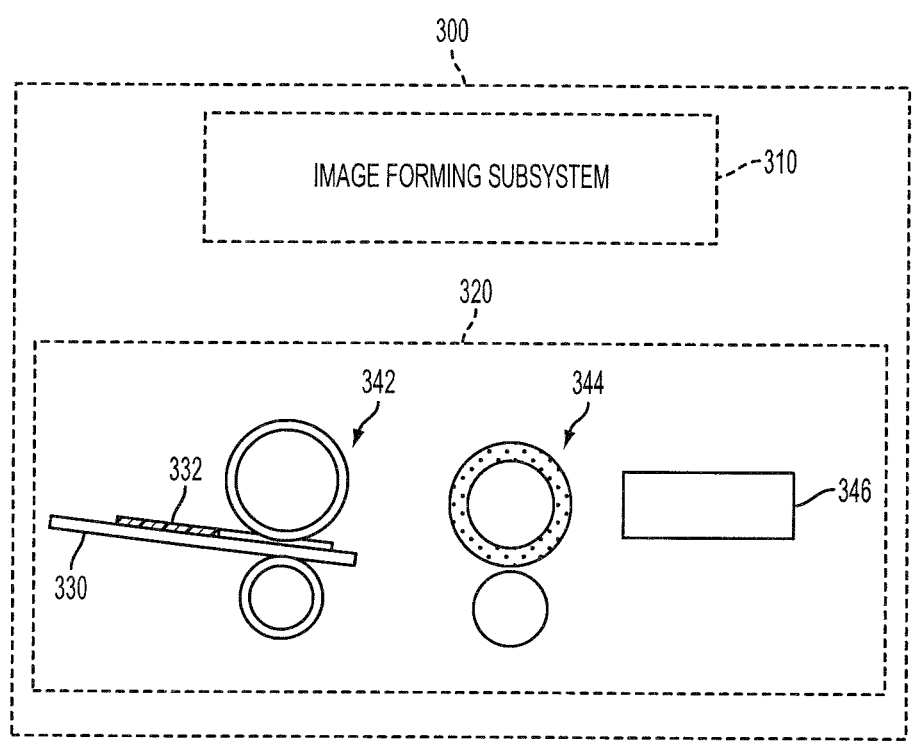
FIG. 3 schematically illustrates an exemplary printing apparatus, according to various embodiments of the present teachings.

FIG. 3 schematically illustrates a printing apparatus 300 in accordance with various embodiments of the present teachings. The printing apparatus 300 can include an image forming subsystem 310 to print an image 332 on a media 330 and an image enhancement subsystem 320 to improve the image 332 quality by reducing an amount of noise in the image 332. The image forming subsystem 310 can include any suitable printing technique, including, but not limited to, electrophotographic printing, inkjet printing, offset lithographic printing, rotogravure, and flexographic printing. Any suitable media 330 can be used, including, but not limited to, uncoated paper, coated paper, films, folding carton materials, and corrugated papers. In some embodiments, the image forming subsystem 310 and the image enhancement subsystem 320 can be integrated together. In other embodiments, the image forming subsystem 310 and the image enhancement subsystem 320 can be separate units. The image enhancement subsystem 320 can include an overcoat layer deposition system 342 to deposit a transparent overcoat layer at least over the image 332 on the media 330. Exemplary overcoat layer deposition system can include, but is not limited to Epic coater (Epic Products International Corporation, Arlington, Tex.), Versa Coater (Drytac Corporation, Richmond, Va.), and UV Coater (Fuller Grafix Inc., Wood Dale, Ill.). In various embodiments, the transparent overcoat layer can include a major amount of cross-linkable resin and a minor amount of a photoinitiator. Any suitable cross-linkable resin can be used, such as, for example, acrylics, epoxy resins, polyester, polyurethane. Exemplary photoinitiator can include, but is not limited to, quinoxaline derivatives, alpha hydroxyketone family, bis-acyl phosphine oxide, and polymeric photoinitiators with sidechains.

The image enhancement subsystem 320 of the printing apparatus 300 can also include an embosser 344 to emboss the transparent overcoat layer to form an embossed micro-structured overcoat layer at least over the image 332 on the media 330 and a curing station 346 to cure the embossed micro-structured overcoat layer to form the micro-structured overcoat layer. Exemplary embosser 344 can include, but is not limited to, anilox roll and any other suitable stamping roll designed to provide suitable structure in the coating layer. The curing station 346 can include one or more of thermal curing system, electron beam, ultra violet curing system, and other energy curing systems.

Figure 4:
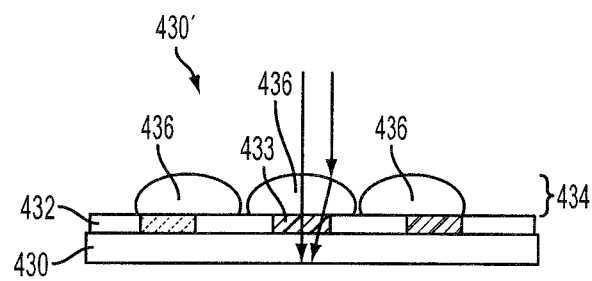
FIG. 4 schematically illustrates a cross section of an exemplary image on a media with a micro-structured overcoat layer, according to various embodiments of the present teachings.

FIG. 4 schematically illustrates a cross section 430' of an exemplary image 432 on a media 430 including a transparent micro-structured overcoat layer 434 at least over the image 432. As shown in FIG. 4, the micro-structured overcoat layer 434 can include an array of microlenses 436. Each microlens 436 of the micro-structured overcoat layer 434 can capture the incident illumination to focus onto a halftone dot 433 of the halftone image 432 and thereby can reduce the amount of noise. Furthermore, the micro-structured overcoat layer 434 can tailor the surface optical properties of the image 432 to promote more uniform image reflection that can serve to reduce the amount of image noise due to the non-uniform media properties. The micro-structured overcoat layer 434 over the surface of the printed image 432 can provide a smooth surface locally, and a uniform and predictable focusing function. This can serve to improve the effective uniformity of the point spread function of the media 430 that can lead to localized variation in the Yule-Nielsen dot gain.

In various embodiments, the noise of the image 332, 432 can be further reduced by tuning and/or optimizing a refractive index of the transparent overcoat layer and hence of the micro-structured overcoat layer 434. Any suitable method can be used to tune and/or optimize the refractive index of the transparent overcoat layer, such as, for example, blending different cross-linkable resins, varying molecular weight of the resins, and adding additives and/or dopants to the resin. For example, polyester can have a refractive index in the range of about 1.58 to about 1.64, polymethylmethacrylate can have a refractive index in the range of about 1.49 to about 1.63, and polystyrene can have a refractive index in the range of about 1.55 to about 1.59 depending upon the monomer unit, functionality of the monomer unit, molecular weight, and dopants.

Figure 5:
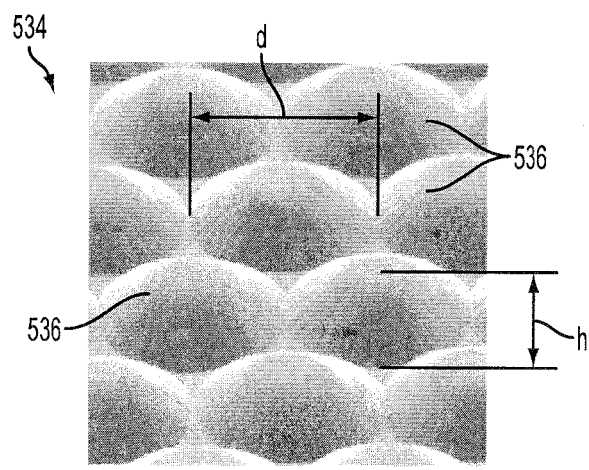
FIG. 5 schematically illustrates an exemplary micro-structured overcoat layer including an array of microlenses, according to various embodiments of the present teachings.

FIG. 5 schematically illustrates an exemplary micro-structured overcoat layer 534 including an array of microlenses 536 in accordance with various embodiments. Each microlens 436, 536 of the micro-structured overcoat layer 434, 534 can have a size, shape, and periodicity optimized for at least one of the media 330, 430 quality, ink properties, and printing technique used to print the image 332, 432 on the media 330, 430. As used herein, the term "ink properties" include colorant concentration and ink mass per unit area. In some embodiments, each microlens 436, 536 can have a diameter, d from about 5 μm to about 50 μm and in other embodiments from about 20 μm to about 50 μm. In various embodiments, each microlens 436, 536 can have a height h from about 5 μm to about 50 μm and in certain embodiments from about 20 μm to about 50 μm. The periodicity of the microlenses 436, 536 in the micro-structured overcoat layer 434, 534 can be in the range from about 5 μm to about 50 μm and in some cases from about 20 μm to about 50 μm. According to various embodiments, each microlens 536 can include any suitable optically optimized shape, including, but not limited to convex, concave, and Fresnel lens structures. Focal lengths of each microlens 536 can be in the range of about 10 μm to about 100 μm. In various embodiments, the media 330, 430 can include, but is not limited to uncoated paper, coated paper, films, folding carton materials, and corrugated papers.

Figure 6:
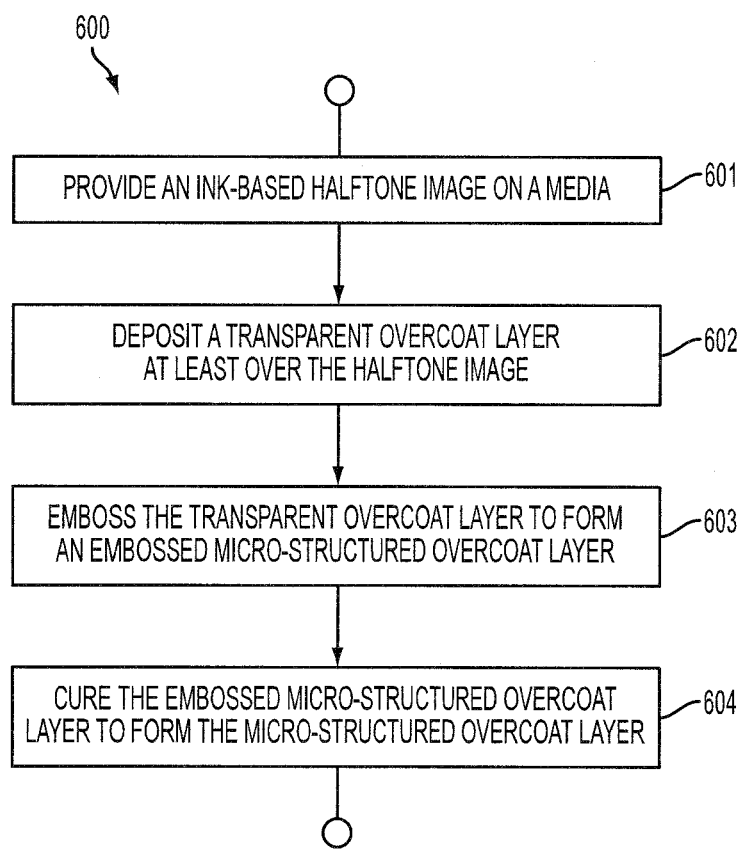
FIG. 6 shows an exemplary method of enhancing an image quality on a media, according to various embodiments of the present teachings.

FIG. 6 shows a method 600 of enhancing an image quality on a media in accordance with present teachings. The method 600 can include providing an ink-based halftone image on a media, wherein the halftone image can include an amount of noise, as in step 601. The halftone image can be printed using any suitable technique such as, for example, electrophotographic printing, inkjet printing, offset lithographic printing, rotogravure, and flexographic printing. The method 600 of enhancing an image quality on a media can also include a step 602 of depositing a transparent overcoat layer at least over the halftone image, wherein the transparent overcoat layer can include a major amount of cross-linkable resin and a minor amount of a photoinitiator. The micro-structured overcoat layer can be deposited using any suitable technique, such as, for example, Epic coater (Epic Products International Corporation, Arlington, Tex.), Versa Coater (Drytac Corporation, Richmond, Va.), and UV Coater (Fuller Grafix Inc., Wood Dale, Ill.). Any suitable cross-linkable resin can be used, such as, for example, acrylics, epoxy resins, polyesters, and polyurethanes. Exemplary photoinitiator can include, but is not limited to, quinoxaline derivatives, alpha hydroxyketone family, bis-acyl phosphine oxide, and polymeric photoinitiators with sidechains. In various embodiments, the step 602 of depositing a transparent overcoat layer at least over the halftone image can further include tuning and/or optimizing a refractive index of the transparent overcoat layer to reduce noise. Any suitable method can be used to tune and/or optimize the refractive index of the transparent overcoat layer, including, but not limited to, blending different cross-linkable resins, varying molecular weight of the resins, and adding additives and/or dopants to the resin. For example, polyester can have a refractive index in the range of about 1.58 to about 1.64, polymethylmethacrylate can have a refractive index in the range of about 1.49 to about 1.63, and polystyrene can have a refractive index in the range of about 1.55 to about 1.59 depending upon the monomer unit, functionality of the monomer unit, molecular weight, and dopants. The method 600 of enhancing an image quality on a media can further include a step 603 of embossing the transparent overcoat layer to form an embossed micro-structured overcoat layer, and a step 604 of curing the embossed micro-structured overcoat layer to form the micro-structured overcoat layer. Exemplary embosser can include, but is not limited to anilox roll. Any other suitable stamping roll designed to provide suitable structure in the overcoat layer can also be used. The curing of the embossed micro-structured overcoat layer can be done using one or more curing techniques such as, for example, thermal curing, electron beam curing, ultra violet curing, and other energy curing. In various embodiments, the micro-structured overcoat layer can include an array of microlenses and each microlens can have a size, shape, and periodicity optimized for at least one of the media quality, ink properties, and printing technique used to print the halftone image on the media. Furthermore, each microlens can have any suitable optically optimized shape such as, for example, convex, concave, and Fresnel lens structures.

In some embodiments, the step 602 of forming a transparent micro-structured overcoat layer at least over the halftone image can include applying the overcoat layer in droplet formation using a digital overcoater, such as, for example, an inkjet coater. The step 602 can further include curing the overcoat layer such that the droplets (hemispherical in shape) are cured into an array of microlenses at least over the halftone image. In some embodiments, leveling may also be applied but only to aid in the formation of the macroscopically uniform overcoat layer. The array of microlenses can result in an altered effect point spread function for the final printed halftone image. In this manner one can provide an improved perceived image uniformity without adversely interfering with the printed image content.

Thus, the present teachings provide methods to improve image uniformity by tailoring the optical properties of the media and the image. Furthermore, the methods of improving image quality in accordance with the present teachings are applicable for a large range of media, such as, for example, uncoated paper, coated paper, films, folding carton materials, and corrugated papers and can be applied in conjunction with existing overcoat processes. Also, the microstructure topology does not adversely affect other print attributes.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A method of enhancing an image quality on a media, comprising:
    providing an ink-based halftone image on a media, wherein the halftone image comprises an amount of noise due to non-uniform properties of the media;
    depositing a transparent overcoat layer at least over the halftone image, wherein the transparent overcoat layer comprises a major amount of cross-linkable resin and a minor amount of a photoinitiator;
    embossing the transparent overcoat layer to form an embossed micro-structured overcoat layer; and
    curing the embossed micro-structured overcoat layer to form the micro-structured overcoat, wherein the micro-structured overcoat layer comprises an array of microlenses, each microlens having a diameter in the range of about 5 µm to about 50 µm;
    configuring the microstructured overcoat layer to reduce the amount of noise due to optical diffusion surrounding halftone dots in the inked-based halftone image and to improve a perceived uniformity of the halftone image compared to a perceived uniformity of the halftone image without the overcoat layer,
    wherein configuring the micro-structured overcoat layer comprises:
    arranging each of the microlenses in the microarray to correspond to a single halftone dot of the halftone image,
    capturing incident illumination with each of the microlenses;
    focusing the incident illumination captured by each of the microlenses onto the corresponding halftone dot, thereby reducing the amount of noise due to optical diffusion surrounding halftone dots.

2. The method of enhancing an image quality on a media, according to claim 1, wherein the cross-linkable resin is selected from a group consisting of acrylics, epoxy resins, polyesters, and polyurethanes.

3. The method of enhancing an image quality on a media, according to claim 1, wherein the photoinitiator is selected from a group consisting quinoxaline derivatives, alpha hydroxyketone family, bis-acyl phosphine oxide, and polymeric photoinitiators with side-chains.

4. The method of enhancing an image quality on a media, according to claim 1, wherein the step of depositing a transparent overcoat layer at least over the halftone image further comprises tuning a refractive index of the transparent overcoat layer to reduce noise.

5. The method of enhancing an image quality on a media, according to claim 1, wherein each microlens has a size, shape, and periodicity optimized for at least one of the media quality, ink properties, and printing technique used to print the halftone image on the media.

6. The method of enhancing an image quality on a media, according to claim 1, wherein each microlens has a shape selected from the group consisting of convex, concave, and Fresnel lens structures.

7. The method of enhancing an image quality on a media, according to claim 1, wherein the ink-based halftone image on the media is formed via a printing technique selected from a group consisting of electrophotographic printing, inkjet printing, offset lithographic printing, rotogravure, and flexographic printing.

8. The method of enhancing an image quality on a media, according to claim 1, wherein the step of providing an ink-based halftone image on a media comprises of providing an ink-based halftone image on a media selected from a group consisting of uncoated paper, coated paper, films, folding carton materials, and corrugated papers.

9. The method of claim 1, wherein each microlens is in a hemispherical shape.

* * * * *